(12) United States Patent
Kato et al.

(10) Patent No.: US 8,684,522 B2
(45) Date of Patent: Apr. 1, 2014

(54) PROGRESSIVE-POWER LENS AND PROGRESSIVE-POWER LENS DESIGN METHOD

(75) Inventors: Kazutoshi Kato, Kamiina-gun (JP); Yohei Suzuki, Kamiina-gun (JP)

(73) Assignee: Hoya Lens Manufacturing Philippines Inc., Cavite (PH)

( * ) Notice: Subject to any disclaimer, the term of this patent is extended or adjusted under 35 U.S.C. 154(b) by 0 days.

(21) Appl. No.: 13/414,331

(22) Filed: Mar. 7, 2012

(65) Prior Publication Data

US 2012/0229757 A1 Sep. 13, 2012

(30) Foreign Application Priority Data

Mar. 8, 2011 (JP) ................................. 2011-049921

(51) Int. Cl.
 *G02C 7/00* (2006.01)
 *G02C 7/02* (2006.01)
 *G02B 7/06* (2006.01)

(52) U.S. Cl.
 USPC .................................................... 351/159.42

(58) Field of Classification Search
 USPC .................................................... 351/159.42
 See application file for complete search history.

(56) References Cited

U.S. PATENT DOCUMENTS

| | | | |
|---|---|---|---|
| 4,561,736 A | 12/1985 | Furter et al. | |
| 5,926,250 A | 7/1999 | Mukaiyama et al. | 351/168 |
| 6,019,470 A | 2/2000 | Mukaiyama et al. | 351/169 |
| 6,186,627 B1 | 2/2001 | Obara | |
| 6,382,789 B1 | 5/2002 | Baudart et al. | |
| 2004/0189932 A1* | 9/2004 | Shinohara et al. | 351/164 |
| 2008/0143959 A1 | 6/2008 | Bourdoncle et al. | |
| 2009/0244480 A1 | 10/2009 | De Gaudemaris et al. | |
| 2011/0187993 A1* | 8/2011 | Alonso Fernandez et al. | 351/169 |
| 2011/0194069 A1* | 8/2011 | Blum et al. | 351/169 |

FOREIGN PATENT DOCUMENTS

WO  WO 97/19382  5/1997

OTHER PUBLICATIONS

Extended European search report dated Jun. 29, 2012 issued in corresponding European application 12158229.0 cites the U.S. patent and U.S. patent application publications above.

* cited by examiner

*Primary Examiner* — Scott J Sugarman
*Assistant Examiner* — Mustak Choudhury
(74) *Attorney, Agent, or Firm* — DLA Piper LLP (US)

(57) ABSTRACT

A progressive-power lens having an eyeball-side surface including a distance portion and a near portion having different values of dioptric power and an intermediate portion that connects the distance portion and the near portion to each other, and an object-side surface including a spherical first region having a first curvature and extending along a principal meridian, a spherical second region having a second curvature equal to the first curvature and facing the distance portion, and a third region located outside the first region and below the second region and having a third curvature smaller than the first curvature.

7 Claims, 17 Drawing Sheets

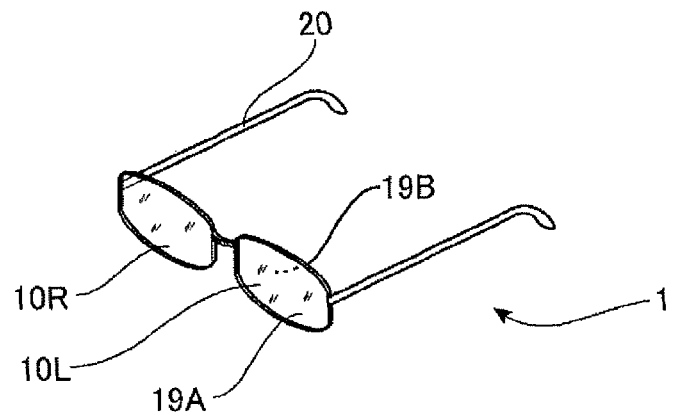
FIG. 1
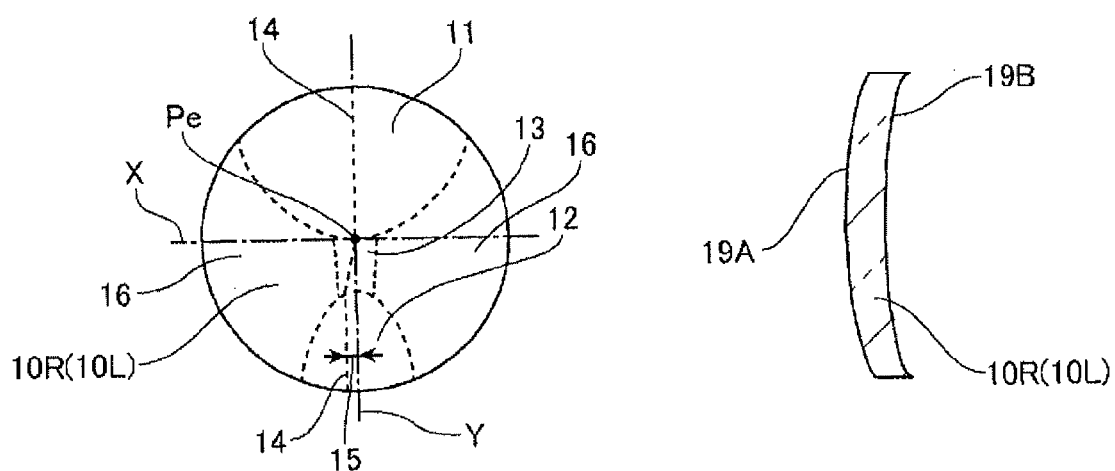
FIG. 2A
FIG. 2B

| DISTANCE FROM PRINCIPAL MERIDIAN IN HORIZONTAL DIRECTION (mm) | 0.0 | 2.0 | 5.0 | 10.0 | 20.0 |
|---|---|---|---|---|---|
| POWER (D) | 4.0 | 4.0 | 3.0 | 2.5 | 2.0 |
| CURVATURE (1/m) | 6.042 | 6.042 | 4.532 | 3.776 | 3.021 |
| RADIUS OF CURVATURE (mm) | 165.500 | 165.500 | 220.667 | 264.800 | 331.000 |

| POWER | -30 | -25 | -20 | -15 | -10 | -5 | 0 | 5 | 10 | 15 | 20 | 25 | 30 |
|---|---|---|---|---|---|---|---|---|---|---|---|---|---|
| 30 | 4 | 4 | 4 | 4 | 4 | 4 | 4 | 4 | 4 | 4 | 4 | 4 | 4 |
| 25 | 4 | 4 | 4 | 4 | 4 | 4 | 4 | 4 | 4 | 4 | 4 | 4 | 4 |
| 20 | 4 | 4 | 4 | 4 | 4 | 4 | 4 | 4 | 4 | 4 | 4 | 4 | 4 |
| 15 | 4 | 4 | 4 | 4 | 4 | 4 | 4 | 4 | 4 | 4 | 4 | 4 | 4 |
| 10 | 4 | 4 | 4 | 4 | 4 | 4 | 4 | 4 | 4 | 4 | 4 | 4 | 4 |
| 5 | 4 | 4 | 4 | 4 | 4 | 4 | 4 | 4 | 4 | 4 | 4 | 4 | 4 |
| 0 | 4 | 4 | 4 | 4 | 4 | 4 | 4 | 4 | 4 | 4 | 4 | 4 | 4 |
| -5 | 3.6 | 3.5 | 3.3 | 3.4 | 3.5 | 3.7 | 4 | 3.7 | 3.5 | 3.4 | 3.3 | 3.5 | 3.6 |
| -10 | 3.2 | 3 | 2.6 | 2.8 | 3 | 3.3 | 4 | 3.3 | 4.4 | 2.8 | 2.6 | 3 | 3.2 |
| -15 | 2.8 | 2.4 | 2 | 2.25 | 2.5 | 3 | 4 | 3 | 2.5 | 2.25 | 2 | 2.4 | 2.8 |
| -20 | 2.8 | 2.4 | 2 | 2.25 | 2.5 | 3 | 4 | 3 | 2.5 | 2.25 | 2 | 2.4 | 2.8 |
| -25 | 2.8 | 2.4 | 2 | 2.25 | 2.5 | 3 | 4 | 3 | 2.5 | 2.25 | 2 | 2.4 | 2.8 |
| -30 | 2.8 | 2.4 | 2 | 2.25 | 2.5 | 3 | 4 | 3 | 2.5 | 2.25 | 2 | 2.4 | 2.8 |

| CURVA-TURE | -30 | -25 | -20 | -15 | -10 | -5 | 0 | 5 | 10 | 15 | 20 | 25 | 30 |
|---|---|---|---|---|---|---|---|---|---|---|---|---|---|
| 30 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 25 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 20 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 15 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 10 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 5 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 0 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| -5 | 5.438066 | 5.287009 | 4.984894 | 5.135952 | 5.287009 | 5.589124 | 6.042296 | 5.589124 | 5.287009 | 5.135952 | 4.984894 | 5.287009 | 5.438066 |
| -10 | 4.833837 | 4.531722 | 3.927492 | 4.229607 | 4.531722 | 4.984894 | 6.042296 | 4.984894 | 6.646526 | 4.229607 | 3.927492 | 4.531722 | 4.833837 |
| -15 | 4.229607 | 3.625378 | 3.021148 | 3.398792 | 3.776435 | 4.531722 | 6.042296 | 4.531722 | 3.776435 | 3.398792 | 3.021148 | 3.625378 | 4.229607 |
| -20 | 4.229607 | 3.625378 | 3.021148 | 3.398792 | 3.776435 | 4.531722 | 6.042296 | 4.531722 | 3.776435 | 3.398792 | 3.021148 | 3.625378 | 4.229607 |
| -25 | 4.229607 | 3.625378 | 3.021148 | 3.398792 | 3.776435 | 4.531722 | 6.042296 | 4.531722 | 3.776435 | 3.398792 | 3.021148 | 3.625378 | 4.229607 |
| -30 | 4.229607 | 3.625378 | 3.021148 | 3.398792 | 3.776435 | 4.531722 | 6.042296 | 4.531722 | 3.776435 | 3.398792 | 3.021148 | 3.625378 | 4.229607 |

| RADIUS OF CURVATURE | -30 | -25 | -20 | -15 | -10 | -5 | 0 | 5 | 10 | 15 | 20 | 25 | 30 | (mm) |
|---|---|---|---|---|---|---|---|---|---|---|---|---|---|---|
| 30 | 165.5 | 165.5 | 165.5 | 165.5 | 165.5 | 165.5 | 165.5 | 165.5 | 165.5 | 165.5 | 165.5 | 165.5 | 165.5 | |
| 25 | 165.5 | 165.5 | 165.5 | 165.5 | 165.5 | 165.5 | 165.5 | 165.5 | 165.5 | 165.5 | 165.5 | 165.5 | 165.5 | |
| 20 | 165.5 | 165.5 | 165.5 | 165.5 | 165.5 | 165.5 | 165.5 | 165.5 | 165.5 | 165.5 | 165.5 | 165.5 | 165.5 | |
| 15 | 165.5 | 165.5 | 165.5 | 165.5 | 165.5 | 165.5 | 165.5 | 165.5 | 165.5 | 165.5 | 165.5 | 165.5 | 165.5 | |
| 10 | 165.5 | 165.5 | 165.5 | 165.5 | 165.5 | 165.5 | 165.5 | 165.5 | 165.5 | 165.5 | 165.5 | 165.5 | 165.5 | |
| 5 | 165.5 | 165.5 | 165.5 | 165.5 | 165.5 | 165.5 | 165.5 | 165.5 | 165.5 | 165.5 | 165.5 | 165.5 | 165.5 | |
| 0 | 165.5 | 165.5 | 165.5 | 165.5 | 165.5 | 165.5 | 165.5 | 165.5 | 165.5 | 165.5 | 165.5 | 165.5 | 165.5 | |
| -5 | 183.8889 | 189.1429 | 200.6061 | 194.7059 | 189.1429 | 178.9189 | 165.5 | 178.9189 | 189.1429 | 194.7059 | 200.6061 | 189.1429 | 183.8889 | |
| -10 | 206.875 | 220.6667 | 254.6154 | 236.4286 | 220.6667 | 200.6061 | 165.5 | 200.6061 | 150.4545 | 236.4286 | 254.6154 | 220.6667 | 206.875 | |
| -15 | 236.4286 | 275.8333 | 331 | 294.2222 | 264.8 | 220.6667 | 165.5 | 220.6667 | 264.8 | 294.2222 | 331 | 275.8333 | 236.4286 | |
| -20 | 236.4286 | 275.8333 | 331 | 294.2222 | 264.8 | 220.6667 | 165.5 | 220.6667 | 264.8 | 294.2222 | 331 | 275.8333 | 236.4286 | |
| -25 | 236.4286 | 275.8333 | 331 | 294.2222 | 264.8 | 220.6667 | 165.5 | 220.6667 | 264.8 | 294.2222 | 331 | 275.8333 | 236.4286 | |
| -30 | 236.4286 | 275.8333 | 331 | 294.2222 | 264.8 | 220.6667 | 165.5 | 220.6667 | 264.8 | 294.2222 | 331 | 275.8333 | 236.4286 | |

FIG. 8

FIG. 9 x COORDINATE (mm)

| y\x | -36 | -32 | -28 | -24 | -20 | -16 | -12 | -8 | -4 | 0 | 4 | 8 | 12 | 16 | 20 | 24 | 28 | 32 | 36 |
|---|---|---|---|---|---|---|---|---|---|---|---|---|---|---|---|---|---|---|---|
| 36 | | | | | | | | | | | | | | | | | | | |
| 32 | | | | | | | | | | | | | | | | | | | |
| 28 | | | | | | | 1.0088189 | | | | | | | | | | | | |
| 24 | | | | | 1.0075411 | 1.0061753 | 1.0046034 | 1.0026284 | 1.0017361 | 1.0016787 | 1.0017212 | 1.0023459 | | | | | | | |
| 20 | | | | 1.0085545 | 1.0073164 | 1.0061653 | 1.0047118 | 1.0029461 | 1.0021058 | 1.0020484 | 1.0020858 | 1.0026994 | 1.0039558 | 1.0055762 | | | | | |
| 16 | | | 1.0096297 | 1.0082456 | 1.0080783 | 1.0061135 | 1.0051608 | 1.0032386 | 1.0024633 | 1.0023857 | 1.0024283 | 1.0030157 | 1.0041693 | 1.0056720 | 1.0072709 | 1.0096427 | | | |
| 12 | | 1.0102360 | 1.0112721 | 1.0091359 | 1.0096887 | 1.0066825 | 1.0057624 | 1.0034811 | 1.0027458 | 1.0026333 | 1.0027383 | 1.0032706 | 1.0042700 | 1.0056804 | 1.0071066 | 1.0082384 | 1.0087264 | | |
| 8 | | 1.0150636 | 1.0156804 | 1.0111653 | 1.0124814 | 1.0077466 | 1.0065032 | 1.0037017 | 1.0029607 | 1.0029384 | 1.0029858 | 1.0034437 | 1.0044726 | 1.0060398 | 1.0076030 | 1.0087297 | 1.0089467 | | |
| 4 | 1.0256364 | 1.0229534 | 1.0211199 | 1.0147404 | 1.0146398 | 1.0094533 | 1.0072243 | 1.0039100 | 1.0031486 | 1.0031437 | 1.0031638 | 1.0036443 | 1.0049175 | 1.0068604 | 1.0088656 | 1.0104186 | 1.0105507 | 1.0092632 | |
| 0 | 1.0439295 | 1.0342228 | 1.0277942 | 1.0183725 | 1.0170542 | 1.0107413 | 1.0072243 | 1.0044565 | 1.0034924 | 1.0033943 | 1.0033421 | 1.0040656 | 1.0057250 | 1.0082818 | 1.0113621 | 1.0141153 | 1.0160705 | 1.0165424 | |
| -4 | 1.0524503 | 1.0395196 | 1.0279256 | 1.0222419 | 1.0185132 | 1.0124561 | 1.0089957 | 1.0053924 | 1.0041269 | 1.0034498 | 1.0034924 | 1.0040666 | 1.0074010 | 1.0103306 | 1.0134879 | 1.0176346 | 1.0178817 | 1.0256049 | 1.0293226 |
| -8 | 1.0608281 | 1.0460497 | 1.0302256 | 1.0241687 | 1.0185132 | 1.0143700 | 1.0099043 | 1.0069043 | 1.0057350 | 1.0034917 | 1.0039087 | 1.0053296 | 1.0096767 | 1.0123635 | 1.0163461 | 1.0216225 | 1.0280379 | 1.0364237 | 1.0499143 |
| -12 | 1.0463507 | 1.0400618 | 1.0358839 | 1.0276532 | 1.0215783 | 1.0176537 | 1.0118182 | 1.0089430 | 1.0079659 | 1.0048344 | 1.0046324 | 1.0071942 | 1.0121692 | 1.0144256 | 1.0181146 | 1.0227091 | 1.0284964 | 1.0376939 | 1.0569272 |
| -16 | | 1.0346954 | 1.0346954 | 1.0296116 | 1.0249840 | 1.0214689 | 1.0159515 | 1.0123452 | 1.0107049 | 1.0107049 | 1.0081607 | 1.0101339 | 1.0152994 | 1.0176642 | 1.0211955 | 1.0254498 | 1.0303342 | 1.0408983 | 1.0626315 |
| -20 | | 1.0327765 | 1.0327051 | 1.0308888 | 1.0279536 | 1.0251575 | 1.0196632 | 1.0192109 | 1.0129452 | 1.0185689 | 1.0136592 | 1.0147069 | 1.0178914 | 1.0206117 | 1.0234148 | 1.0263211 | 1.0294022 | 1.0352069 | 1.0442982 |
| -24 | | 1.0226995 | 1.0279608 | 1.0300739 | 1.0280087 | 1.0277886 | 1.0235036 | 1.0204549 | 1.0192109 | 1.0195659 | 1.0193313 | 1.0163879 | 1.0203330 | 1.0239904 | 1.0250398 | 1.0272441 | 1.0288743 | 1.0311611 | |
| -28 | | | 1.0246748 | 1.0289673 | 1.0298229 | 1.0296795 | 1.0277004 | 1.0256103 | 1.0204949 | 1.0256674 | 1.0237026 | 1.0206837 | 1.0223007 | 1.0248095 | 1.0257249 | 1.0274194 | 1.0276952 | 1.0268374 | |
| -32 | | | 1.0235841 | 1.0279982 | 1.0300015 | 1.0310052 | 1.0307583 | 1.0296183 | 1.0310680 | 1.0280159 | 1.0236629 | 1.0215276 | 1.0235920 | 1.0261184 | 1.0267661 | 1.0280569 | 1.0279346 | | |
| -36 | | | | 1.0293720 | 1.0309015 | 1.0233323 | 1.0307583 | 1.0348542 | 1.0310680 | 1.0293546 | 1.0273824 | 1.0232337 | 1.0237070 | 1.0272056 | 1.0281016 | 1.0291943 | 1.0288291 | | |
| | | | | | 1.0310155 | 1.0339248 | 1.0328108 | 1.0355853 | 1.0321016 | 1.0304115 | 1.0281157 | 1.0239728 | 1.0249822 | 1.0284724 | 1.0298016 | 1.0320534 | | | |
| | | | | | | | 1.0346033 | 1.0361234 | 1.0318815 | 1.0302331 | 1.0282311 | 1.0246923 | 1.0249822 | 1.0284724 | 1.0301686 | | | | |
| | | | | | | | 1.0358429 | | 1.0321189 | 1.0304415 | 1.0286065 | 1.0252808 | 1.0260655 | 1.0303712 | | | | | |
| | | | | | | | | 1.0372270 | 1.0331857 ← 10a | 1.0313238 | 1.0295136 | 1.0260555 | | | | | | | | y COORDINATE (mm)

FIG. 10

FIG. 11 x COORDINATE (mm)

| | -36 | -32 | -28 | -24 | -20 | -16 | -12 | -8 | -4 | 0 | 4 | 8 | 12 | 16 | 20 | 24 | 28 | 32 | 36 |
|---|---|---|---|---|---|---|---|---|---|---|---|---|---|---|---|---|---|---|---|
| 36 | | | | | | | | | | | | 0.9993925 | | | | | | | |
| 32 | | | | | | | | | | | 0.9986027 | 1.0000499 | 1.0016840 | 1.0038107 | | | | | |
| 28 | | | | | | | | | | 0.9985407 | 0.9992483 | 1.0006585 | 1.0022012 | 1.0041494 | 1.0062269 | 1.0080482 | | | |
| 24 | | | | 1.0078995 | 1.0065041 | 1.0044052 | | | 0.9986151 | 0.9991986 | 0.9998772 | 1.0006585 | 1.0024969 | 1.0043094 | 1.0061335 | 1.0075787 | 1.0081495 | | |
| 20 | | | 1.0077767 | 1.0074824 | 1.0063781 | 1.0046438 | 1.0022285 | 1.0003903 | 0.9992681 | 0.9991986 | 1.0004745 | 1.0011814 | 1.0024969 | 1.0043094 | 1.0068458 | 1.0082681 | 1.0084379 | | |
| 16 | | 1.0115375 | 1.0090163 | 1.0088218 | 1.0072878 | 1.0047504 | 1.0026062 | 1.0008728 | 0.9999071 | 0.9998250 | 0.9998772 | 1.0015309 | 1.0026659 | 1.0047849 | 1.0087491 | 1.0107540 | 1.0107693 | 1.0090251 | |
| 12 | | 1.0221831 | 1.0120843 | 1.0114884 | 1.0094200 | 1.0054159 | 1.0028818 | 1.0013760 | 1.0004869 | 1.0003973 | 1.0004745 | 1.0019256 | 1.0033472 | 1.0060288 | 1.0124550 | 1.0160072 | 1.0186689 | 1.0198570 | |
| 8 | 1.0391179 | 1.0344533 | 1.0209994 | 1.0169664 | 1.0133723 | 1.0069109 | 1.0039343 | 1.0018005 | 1.0009675 | 1.0009029 | 1.0014041 | 1.0019256 | 1.0049430 | 1.0084184 | 1.0124550 | 1.0211179 | 1.0263940 | 1.0317951 | 1.0376803 |
| 4 | 1.0597301 | 1.0481678 | 1.0287780 | 1.0227529 | 1.0175248 | 1.0097247 | 1.0043952 | 1.0031819 | 1.0013542 | 1.0013418 | 1.0017243 | 1.0026189 | 1.0082678 | 1.0117011 | 1.0159912 | 1.0211179 | 1.0339275 | 1.0442723 | 1.0614348 |
| 0 | 1.0657918 | 1.0516290 | 1.0380017 | 1.0292276 | 1.0222166 | 1.0126538 | 1.0061026 | 1.0045946 | 1.0018991 | 1.0017715 | 1.0026286 | 1.0048259 | 1.0123880 | 1.0158157 | 1.0204764 | 1.0265834 | 1.0355770 | 1.0438934 | 1.0672431 |
| -4 | 1.0706939 | 1.0551986 | 1.0405576 | 1.0320852 | 1.0247145 | 1.0161633 | 1.0079517 | 1.0075659 | 1.0029493 | 1.0020688 | 1.0043051 | 1.0081744 | 1.0162415 | 1.0191470 | 1.0231971 | 1.0278587 | 1.0349997 | 1.0452488 | 1.0704883 |
| -8 | 1.0536041 | 1.0467961 | 1.0442014 | 1.0360310 | 1.0286338 | 1.0192614 | 1.0108971 | 1.0128824 | 1.0057174 | 1.0022496 | 1.0104875 | 1.0137412 | 1.0207805 | 1.0237087 | 1.0271468 | 1.0265834 | 1.0326382 | 1.0481093 | 1.0495561 |
| -12 | | 1.0375877 | 1.0380288 | 1.0365507 | 1.0315029 | 1.0236563 | 1.0156232 | 1.0156232 | 1.0106561 | 1.0048344 | 1.0104875 | 1.0214698 | 1.0242203 | 1.0272429 | 1.0295468 | 1.0295468 | 1.0316581 | 1.0338292 | |
| -16 | | 1.0259485 | 1.0322976 | 1.0264340 | 1.0359921 | 1.0284455 | 1.0218188 | 1.0210943 | 1.0191325 | 1.0166333 | 1.0219512 | 1.0274239 | 1.0281753 | 1.0302774 | 1.0310791 | 1.0318738 | 1.0304137 | 1.0271095 | |
| -20 | | | 1.0285410 | 1.0343300 | 1.0341605 | 1.0350897 | 1.0329995 | 1.0320531 | 1.0330838 | 1.0255628 | 1.0319712 | 1.0320378 | 1.0302756 | 1.0322547 | 1.0317626 | 1.0323260 | 1.0398107 | | |
| -24 | | | 1.0046734 | 1.0336740 | 1.0354136 | 1.0385327 | 1.0405702 | 1.0424059 | 1.0499249 | 1.0484928 | 1.0418728 | 1.0343867 | 1.0341852 | 1.0345583 | 1.0336728 | 1.0335171 | 1.0046398 | | |
| -28 | | | | 1.0333636 | 1.0372923 | 1.0420790 | 1.0469681 | 1.0511093 | 1.0599610 | 1.0572843 | 1.0425873 | 1.0386898 | 1.0341852 | 1.0371651 | 1.0384779 | 1.0354850 | | | |
| -32 | | | | 1.0040858 | 1.0409201 | 1.0461217 | 1.0518638 | 1.0592328 | 1.0659510 | 1.0618759 | 1.0519728 | 1.0414348 | 1.0351114 | 1.0371651 | 1.0406510 | 1.0040851 | | | |
| -36 | | | | | | 1.0037653 | 1.0596297 | 1.0699850 | 1.0704738 | 1.0678333 | 1.0594980 | 1.0441226 | 1.0385745 | 1.0406510 | 1.0037696 | | | | |
| | | | | | | | 1.0046571 | | 1.0044657 | 1.0048497 | 1.0044656 | 1.0046569 | 1.0042267 | | | | | | | y COORDINATE (mm)

FIG. 13

FIG.14 x COORDINATE (mm)

| | -36 | -32 | -28 | -24 | -20 | -16 | -12 | -8 | -4 | 0 | 4 | 8 | 12 | 16 | 20 | 24 | 28 | 32 | 36 |
|---|---|---|---|---|---|---|---|---|---|---|---|---|---|---|---|---|---|---|---|
| 36 | | | | | | | | 0.9996884 | 0.9966154 | 0.9965410 | 0.9966030 | 0.9993826 | | | | | | | |
| 32 | | | | | | | 1.0022285 | 1.0003904 | 0.9992653 | 0.9991988 | 0.9992485 | 1.0000490 | 1.0016840 | 1.0038104 | | | | | |
| 28 | | | | | 1.0065126 | 1.0044049 | 1.0026085 | 1.0008733 | 0.9999072 | 0.9992251 | 0.9992774 | 1.0006590 | 1.0022035 | 1.0041539 | 1.0062354 | 1.0080626 | | | |
| 24 | | | 1.0079134 | 1.0074915 | 1.0063841 | 1.0047539 | 1.0028836 | 1.0013770 | 1.0004971 | 1.0003975 | 1.0004747 | 1.0011824 | 1.0025009 | 1.0043120 | 1.0061397 | 1.0075875 | 1.0081612 | | |
| 20 | | | 1.0089811 | 1.0085988 | 1.0072744 | 1.0054098 | 1.0033919 | 1.0018013 | 1.0009680 | 1.0010032 | 1.0010104 | 1.0015317 | 1.0025009 | 1.0047790 | 1.0063328 | 1.0082446 | 1.0084015 | | |
| 16 | | 1.0113880 | 1.0119763 | 1.0093764 | 1.0093764 | 1.0068883 | 1.0043848 | 1.0022485 | 1.0013545 | 1.0013421 | 1.0014044 | 1.0019237 | 1.0033368 | 1.0060662 | 1.0087051 | 1.0106810 | 1.0106807 | 1.0088773 | |
| 12 | | 1.0222222 | 1.0201259 | 1.0169821 | 1.0133795 | 1.0097856 | 1.0061045 | 1.0031790 | 1.0018857 | 1.0017114 | 1.0017239 | 1.0026160 | 1.0049448 | 1.0084192 | 1.0124606 | 1.0160257 | 1.0187039 | 1.0199059 | |
| 8 | 1.0398000 | 1.0349726 | 1.0291504 | 1.0230001 | 1.0176721 | 1.0127284 | 1.0079817 | 1.0046038 | 1.0029487 | 1.0020685 | 1.0026260 | 1.0048292 | 1.0082977 | 1.0117750 | 1.0161398 | 1.0213676 | 1.0267712 | 1.0323144 | 1.0383575 |
| 4 | 1.0615220 | 1.0495310 | 1.0399856 | 1.0298914 | 1.0226253 | 1.0163829 | 1.0107903 | 1.0076153 | 1.0057218 | 1.0022410 | 1.0043095 | 1.0082042 | 1.0124810 | 1.0160360 | 1.0208903 | 1.0272461 | 1.0349006 | 1.0456076 | 1.0632462 |
| 0 | 1.0672230 | 1.0531169 | 1.0417593 | 1.0328609 | 1.0252259 | 1.0195721 | 1.0157998 | 1.0130790 | 1.0108661 | 1.0048368 | 1.0105184 | 1.0138320 | 1.0164163 | 1.0194609 | 1.0237193 | 1.0286263 | 1.0346449 | 1.0454200 | 1.0692198 |
| -4 | 1.0726039 | 1.0567079 | 1.0453737 | 1.0369164 | 1.0291794 | 1.0241105 | 1.0211338 | 1.0192949 | 1.0166322 | 1.0166322 | 1.0212249 | 1.0216713 | 1.0210928 | 1.0241679 | 1.0278030 | 1.0314587 | 1.0381145 | 1.0466913 | 1.0724493 |
| -8 | 1.0641333 | 1.0472777 | 1.0419808 | 1.0370796 | 1.0320281 | 1.0283368 | 1.0273932 | 1.0233790 | 1.0332219 | 1.0325584 | 1.0321103 | 1.0277478 | 1.0246431 | 1.0241679 | 1.0300709 | 1.0316070 | 1.0331370 | 1.0385856 | 1.0500273 |
| -12 | | 1.0373553 | 1.0381001 | 1.0367586 | 1.0349812 | 1.0325345 | 1.0335567 | 1.0428594 | 1.0491448 | 1.0484062 | 1.0420915 | 1.0332466 | 1.0287290 | 1.0308829 | 1.0315620 | 1.0322004 | 1.0317553 | 1.0328609 | |
| -16 | | 1.0252338 | 1.0320839 | 1.0350892 | 1.0346742 | 1.0357754 | 1.0412492 | 1.0516785 | 1.0602820 | 1.0572722 | 1.0428838 | 1.0349299 | 1.0325511 | 1.0329219 | 1.0322481 | 1.0325451 | 1.0302557 | 1.0263089 | |
| -20 | | | 1.0284789 | 1.0340407 | 1.0368824 | 1.0393537 | 1.0476817 | 1.0598885 | 1.0641031 | 1.0618858 | 1.0522228 | 1.0332241 | 1.0349912 | 1.0353698 | 1.0343121 | 1.0338817 | 1.0388090 | | |
| -24 | | | 1.0048368 | 1.0339183 | 1.0360250 | 1.0430245 | 1.0527887 | 1.0649167 | 1.0633631 | 1.0633531 | 1.0555812 | 1.0421618 | 1.0380210 | 1.0381001 | 1.0372776 | 1.0360557 | 1.0048368 | | |
| -28 | | | | 1.0048368 | 1.0418943 | 1.0471740 | 1.0573946 | 1.0681174 | 1.0811117 | 1.0651142 | 1.0579790 | 1.0449036 | 1.0380210 | 1.0418918 | 1.0416351 | 1.0048368 | | | |
| -32 | | | | | | 1.0048368 | 1.0606649 | 1.0708122 | 1.0706664 | 1.0679187 | 1.0588873 | 1.0472266 | 1.0394800 | 1.0048368 | | | | | |
| -36 | | | | | | | | 1.0048368 | 1.0048368 | 1.0048368 | 1.0048368 | 1.0048368 | 1.0438398 | | | | | | | y COORDINATE (mm)

FIG.16 x COORDINATE (mm)

| y\x | -36 | -32 | -28 | -24 | -20 | -16 | -12 | -8 | -4 | 0 | 4 | 8 | 12 | 16 | 20 | 24 | 28 | 32 | 36 |
|---|---|---|---|---|---|---|---|---|---|---|---|---|---|---|---|---|---|---|---|
| 36 | | | | | | | | | | | | | | | | | | | |
| 32 | | | | | | | | | | | | | | 1.0020888 | | | | | |
| 28 | | | 1.0080522 | | | | | | | | | | 0.9994647 | 1.0026566 | 1.0054693 | 1.0076868 | 1.0085239 | | |
| 24 | | 1.0000000 | 1.0084240 | 1.0074596 | 1.0058266 | 1.0033698 | 1.0008137 | 0.9977154 | 0.9964909 | 0.9964119 | 0.9964712 | 0.9974556 | 1.0003978 | 1.0032230 | 1.0056099 | 1.0076318 | | | |
| 20 | | 1.0095484 | 1.0106924 | 1.0078303 | 1.0061277 | 1.0036490 | 1.0012629 | 0.9985876 | 0.9973965 | 0.9973143 | 0.9973663 | 0.9983668 | 1.0008487 | 1.0032800 | 1.0057977 | 1.0077423 | 1.0084784 | | |
| 16 | | 1.0214038 | 1.0195663 | 1.0104231 | 1.0081819 | 1.0038214 | 1.0013719 | 0.9993693 | 0.9982778 | 0.9981564 | 0.9982555 | 0.9991779 | 1.0004487 | 1.0032800 | 1.0075556 | 1.0098551 | 1.0100505 | | |
| 12 | 1.0449288 | 1.0381987 | 1.0322967 | 1.0161092 | 1.0132359 | 1.0092683 | 1.0024513 | 0.9993337 | 0.9990692 | 0.9989129 | 0.9991089 | 0.9995801 | 1.0013350 | 1.0044474 | 1.0120013 | 1.0153835 | 1.0178469 | 1.0189236 | |
| 8 | 1.0745296 | 1.0592928 | 1.0477246 | 1.0264601 | 1.0206439 | 1.0147197 | 1.0066980 | 1.0015696 | 0.9996507 | 0.9995787 | 0.9997352 | 1.0001928 | 1.0037334 | 1.0077181 | 1.0183340 | 1.0242151 | 1.0293839 | 1.0341031 | 1.0091971 |
| 4 | 1.0838824 | 1.0611862 | 1.0532837 | 1.0382005 | 1.0294402 | 1.0210276 | 1.0130364 | 1.0036393 | 1.0001664 | 1.0001386 | 1.0009917 | 1.0037143 | 1.0088169 | 1.0130526 | 1.0264546 | 1.0347765 | 1.0431752 | 1.0523341 | 1.0873946 |
| 0 | 1.0893521 | 1.0713186 | 1.0564903 | 1.0433919 | 1.0335302 | 1.0255397 | 1.0196872 | 1.0074425 | 1.0047796 | 1.0048344 | 1.0108284 | 1.0037143 | 1.0088169 | 1.0199997 | 1.0316050 | 1.0394544 | 1.0473765 | 1.0572673 | 1.0754741 |
| -4 | 1.0622843 | 1.0559249 | 1.0505599 | 1.0466075 | 1.0393921 | 1.0310859 | 1.0279410 | 1.0155395 | 1.0128530 | 1.0225015 | 1.0120141 | 1.0163741 | 1.0199997 | 1.0246645 | 1.0376088 | 1.0445377 | 1.0515769 | 1.0607062 | 1.0775699 |
| -8 | | 1.0394415 | 1.0416257 | 1.0486075 | 1.0384409 | 1.0344728 | 1.0279410 | 1.0268131 | 1.0252968 | 1.0466413 | 1.0278816 | 1.0272876 | 1.0260720 | 1.0309063 | 1.0390022 | 1.0423980 | 1.0449462 | 1.0473104 | 1.0485152 |
| -12 | | 1.0220822 | 1.0312437 | 1.0467076 | 1.0360441 | 1.0378334 | 1.0341058 | 1.0431483 | 1.0467067 | 1.0717193 | 1.0438510 | 1.0369917 | 1.0302109 | 1.0461131 | 1.0390022 | 1.0399150 | 1.0386193 | 1.0353145 | |
| -16 | | | 1.0263219 | 1.0357208 | 1.0362171 | 1.0403544 | 1.0419376 | 1.0591080 | 1.0720215 | 1.0864957 | 1.0599801 | 1.0429282 | 1.0355781 | 1.0376438 | 1.0376438 | 1.0376438 | | | |
| -20 | | | | 1.0339081 | 1.0371167 | 1.0450155 | 1.0524687 | 1.0732062 | 1.0905939 | 1.0864957 | 1.0613688 | 1.0467234 | 1.0412210 | 1.0387630 | 1.0372047 | 1.0368676 | 1.0320300 | 1.0234710 | |
| -24 | | | 1.0046734 | 1.0350143 | 1.0415437 | 1.0405155 | 1.0621087 | 1.0889818 | 1.0988383 | 1.0949869 | 1.0772636 | 1.0537570 | 1.0437181 | 1.0410939 | 1.0369959 | 1.0363107 | 1.0298230 | | |
| -28 | | | | 1.0040958 | 1.0038972 | 1.0510552 | 1.0704019 | 1.0956684 | 1.1026192 | 1.0987394 | 1.0834964 | 1.0585172 | 1.0449207 | 1.0446523 | 1.0418986 | 1.0363509 | 1.0346388 | | |
| -32 | | | | | | 1.0381274 | 1.0761714 | 1.1013707 | 1.1067682 | 1.1029850 | 1.0883314 | 1.0633770 | 1.0505310 | 1.0501661 | 1.0474904 | 1.0340951 | | | |
| -36 | | | | | | 1.0037653 | 1.0038561 | 1.0065187 | 1.1127825 | 1.1092167 | 1.0924510 | 1.0676209 | 1.0036815 | 1.0037696 | | | | | |

Table showing coordinate values with x COORDINATE (mm) as columns and y COORDINATE (mm) as rows. Reference label: 10f

| y\x | -36 | -32 | -28 | -24 | -20 | -16 | -12 | -8 | -4 | 0 | 4 | 8 | 12 | 16 | 20 | 24 | 28 | 32 | 36 |
|---|---|---|---|---|---|---|---|---|---|---|---|---|---|---|---|---|---|---|---|
| 36 | | | | | | | | | | | | | | | | | | | |
| 32 | | | | | | | | | | | | 0.9994646 | 1.0020885 | | | | | | |
| 28 | | | | | 1.0076481 | 1.0027110 | 1.0000341 | 0.9967926 | 0.9955606 | 0.9954788 | 0.9955730 | 0.9964121 | 1.0004000 | 1.0026611 | 1.0054778 | | | | |
| 24 | | | 1.0080651 | 1.0074688 | 1.0058325 | 1.0033743 | 1.0008150 | 0.9977156 | 0.9964714 | 0.9964121 | 0.9964911 | 0.9974556 | 1.0009506 | 1.0032266 | 1.0056161 | 1.0077011 | | | |
| 20 | | | 1.0063868 | 1.0078073 | 1.0061145 | 1.0035624 | 1.0012647 | 0.9985861 | 0.9973665 | 0.9973145 | 0.9973665 | 0.9983673 | 1.0007063 | 1.0032742 | 1.0057847 | 1.0076405 | 1.0085356 | | |
| 16 | | 1.0093892 | 1.0105845 | 1.0103507 | 1.0081384 | 1.0038154 | 1.0013695 | 0.9993603 | 0.9982558 | 0.9981586 | 0.9982781 | 0.9991789 | 1.0008506 | 1.0032742 | 1.0057847 | 1.0077188 | 1.0084419 | | |
| 12 | | 1.0214429 | 1.0195928 | 1.0167248 | 1.0092442 | 1.0052715 | 1.0024409 | 0.9998346 | 0.9991094 | 0.9989132 | 0.9990696 | 0.9996809 | 1.0007063 | 1.0044249 | 1.0075117 | 1.0097822 | 1.0099420 | 1.0084293 | |
| 8 | 1.0456158 | 1.0397198 | 1.0326724 | 1.0267082 | 1.0132442 | 1.0092700 | 1.0052539 | 1.0005444 | 0.9997356 | 0.9995790 | 0.9996511 | 0.9996511 | 1.0001909 | 1.0013246 | 1.0077188 | 1.0154020 | 1.0178809 | 1.0189725 | |
| 4 | 1.0763465 | 1.0606705 | 1.0487177 | 1.0387092 | 1.0207917 | 1.0147944 | 1.0087279 | 1.0015467 | 1.0015467 | 1.0001585 | 1.0001660 | 1.0006864 | 1.0008758 | 1.0037352 | 1.0131267 | 1.0244655 | 1.0297622 | 1.0346236 | 1.0396754 |
| 0 | 1.0858463 | 1.0676946 | 1.0543988 | 1.0441761 | 1.0298519 | 1.0212492 | 1.0131318 | 1.0036424 | 1.0047340 | 1.0010079 | 1.0013720 | 1.0037176 | 1.0094875 | 1.0088469 | 1.0199162 | 1.0354445 | 1.0441571 | 1.0541803 | 1.0691260 |
| -4 | 1.0908947 | 1.0798530 | 1.0596366 | 1.0495036 | 1.0340480 | 1.0258513 | 1.0198645 | 1.0077119 | 1.0047340 | 1.0048368 | 1.0033117 | 1.0094875 | 1.0143354 | 1.0143354 | 1.0249802 | 1.0402306 | 1.0464496 | 1.0587120 | 1.0774661 |
| -8 | 1.0627373 | 1.0564107 | 1.0510735 | 1.0455036 | 1.0390340 | 1.0315434 | 1.0282579 | 1.0156304 | 1.0120451 | 1.0048368 | 1.0120451 | 1.0164651 | 1.0201751 | 1.0201751 | 1.0313887 | 1.0454200 | 1.0527197 | 1.0621700 | 1.0795439 |
| -12 | | 1.0392086 | 1.0416972 | 1.0455532 | 1.0399698 | 1.0349167 | 1.0345357 | 1.0271149 | 1.0128841 | 1.0226005 | 1.0277357 | 1.0274804 | 1.0263857 | 1.0313887 | 1.0382717 | 1.0429271 | 1.0454499 | 1.0477909 | 1.0499660 |
| -16 | | 1.0213702 | 1.0310301 | 1.0410335 | 1.0385453 | 1.0384166 | 1.0424097 | 1.0434167 | 1.0253698 | 1.0466368 | 1.0439917 | 1.0433819 | 1.0306362 | 1.0351358 | 1.0382234 | 1.0492441 | 1.0387171 | 1.0351458 | |
| -20 | | | 1.0262599 | 1.0359302 | 1.0367318 | 1.0410335 | 1.0531555 | 1.0595868 | 1.0464467 | 1.0466368 | 1.0601026 | 1.0472913 | 1.0361358 | 1.0394343 | 1.0376927 | 1.0370876 | 1.0318718 | 1.0228726 | |
| -24 | | | 1.0048368 | 1.0342748 | 1.0363670 | 1.0458416 | 1.0629341 | 1.0737873 | 1.0722462 | 1.0717116 | 1.0616706 | 1.0544209 | 1.0419105 | 1.0419105 | 1.0376927 | 1.0368864 | 1.0291123 | | |
| -28 | | | | 1.0355699 | 1.0393870 | 1.0520988 | 1.0629341 | 1.0876652 | 1.0900036 | 1.0864833 | 1.0716706 | 1.0592560 | 1.0445316 | 1.0459940 | 1.0427025 | 1.0389131 | 1.0048368 | | |
| -32 | | | | 1.0048368 | 1.0423699 | 1.0591918 | 1.0791787 | 1.0964298 | 1.0992034 | 1.0949662 | 1.0838903 | 1.0641723 | 1.0514777 | 1.0612164 | 1.0494578 | | | | |
| -36 | | | | | 1.0048368 | 1.0048368 | 1.0049368 | 1.0219355 | 1.0301933 | 1.0290496 | 1.0892303 | 1.0641723 | 1.0048368 | 1.0048368 | | | | | |

FIG.18

PROGRESSIVE-POWER LENS AND PROGRESSIVE-POWER LENS DESIGN METHOD

This application claims priority to Japanese Patent Application No. 2011-049921, filed Mar. 8, 2011, the entirety of which is hereby incorporated by reference.

BACKGROUND

1. Technical Field

The present invention relates to a spectacle progressive-power lens and a progressive-power lens design method.

2. Related Art

International Publication WO97/19382 describes a progressive-power lens used as a spectacle lens suitable for presbyopia correction or other vision correction and having a progressive-power eyeball-side surface instead of a progressive-power object-side surface in related art. This configuration allows the object-side surface to be a spherical surface having a fixed base curve, whereby the difference in magnification between the distance portion and the near portion can be reduced. In addition, variation in magnification caused by a shape factor can be suppressed. As a result, the amount of image shaking and distortion due to the difference in magnification can be reduced, whereby a progressive-power lens that provides a comfortable field of view can be provided. Further, International Publication WO97/19382 describes that a combination method allows a progressive-power surface and a toric surface for astigmatism correction to be combined as the eyeball-side surface to reduce the amounts of image shaking and distortion also in a progressive-power lens for astigmatism correction.

Although the above and other technologies have improved the performance of a progressive-power lens, some users still cannot adapt to the characteristics of a progressive-power lens, particularly the image shaking phenomenon, and further improvement is therefore desired.

SUMMARY

An aspect of the invention relates to a progressive-power lens having an eyeball-side surface including a distance portion and a near portion having different values of dioptric power and an intermediate portion that connects the distance portion and the near portion to each other, and an object-side surface including a spherical first region having first curvature and extending along a principal meridian, a spherical second region having second curvature equal to the first curvature and facing the distance portion, and a third region located outside the first region and below the second region and having third curvature smaller than the first curvature.

A so-called inner-surface progressive lens in which the eyeball-side surface (inner surface) includes a distance portion, a near portion, and an intermediate portion, the object-side surface (outer surface) can be a spherical surface having fixed curvature, that is, fixed surface power. According to the configuration described above, the difference in magnification or the ratio of magnification among images formed through the distance portion, the intermediate portion, and the near portion can be reduced, and hence the amount of shaking of an image formed through the progressive-power lens can be reduced. On the other hand, in a progressive-power lens, since the dioptric power increases in the near portion and hence the power increases, an image formed through the near portion is larger than an image formed through the distance portion. An image formed through a portion on either side of the intermediate portion and the near portions is also larger than an image formed through the distance portion. As a result, for a user who frequently uses the distance portion and the intermediate portion, change in the magnification at which an age formed through the progressive-power lens tends to be large, and hence the wearer (user) senses image shaking or feels uncomfortable in some cases.

In the progressive-power lens according to the aspect of the invention, to reduce the increase in size of an image due to the increase in power, the surface power of the object-side surface is reduced by setting the third curvature of the third region of the object-side surface, which is located outside the first region and below the second region, that is, the region outside the intermediate and near portions rightward and leftward (outside in horizontal direction), to be smaller than the first and second curvature of the spherical first and second regions. As a result, the degree of image shaking produced when the line of sight is moved from the distance portion to the intermediate portion or a portion therearound can be reduced, whereby a spectacle progressive-power lens that reduces discomfort that the wearer feels can be provided.

In the progressive-power lens, it is preferable that the third region has an aspherical shape, and that the third curvature decreases with distance from the principal meridian outward in a horizontal direction (rightward and leftward). The configuration described above prevents an abrupt change in magnification at which an image is formed through a portion on either side of the intermediate portion and the near portion with respect to an image formed therethrough. The distortion of an image produced across the spectacle lens can therefore be reduced.

It is preferable that the third curvature of the third region monotonously decreases with distance from the principal meridian outward in the horizontal direction. A surface having the third curvature that changes monotonously with distance outward in the horizontal direction can be manufactured relatively readily and economically.

A width W of the first region of the progressive-power lens that corresponds to both sides of the principal meridian preferably satisfies the following condition:

$$6 \leq W \leq 14 \tag{1}$$

where the unit of the width W is millimeter.

In a typical progressive-power lens, the near portion is inset by a value ranging from 2 to 3 mm. In view of this fact, when the width W of the first region corresponding to both sides of the principal meridian is 6 mm, that is, when a fixed-curvature region having a width of ±3 mm with respect to the principal meridian is provided, the intermediate portion (progressive portion) is accommodated in the fixed-curvature region, whereby the viewing area of the intermediate portion, which has the narrowest viewing area, is ensured. On the other hand, the near portion of a current progressive-power lens is inset by 5 mm at the maximum, which is practically the greatest value necessary for an object distance of 15 cm. When the center of the near portion is inset by 5 mm, another ensured viewing area of 2 mm may be provided by increasing the width W of the first region corresponding to both sides of the principal meridian to 14 mm, that is, by providing a fixed-curvature region having a width of ±7 mm with respect to the principal meridian.

Another aspect of the invention relates to spectacles including the progressive-power lens described above and a spectacle frame to which the progressive-power lens is attached on both sides.

Still another aspect of the invention relates to a progressive-power lens design method including designing an eyeball-side surface based on spectacle specifications, the eyeball-side surface including a distance portion and a near portion having different values of dioptric power and an intermediate portion that connects the distance portion and the near portion to each other, and designing an object-side surface including a spherical first region having first curvature and extending along a principal meridian, a spherical second region having second curvature equal to the first curvature and facing the distance portion, and a third region located outside the first region and below the second region and having third curvature smaller than the first curvature.

According to the configuration described above, the difference in magnification or the ratio of magnification between an image formed in distance vision, in which an image is acquired through the distance portion, and an image formed through a portion on either side of the intermediate portion and the near portion can be reduced, and hence the degree of image shaking produced across the spectacle lens can be suppressed. In particular, a spectacle progressive-power lens that reduces discomfort that a user who frequently uses distance vision and intermediate vision feels can be provided.

In the design method, the object-side surface is preferably so designed that the third curvature of the aspheric third region decreases with distance from the principal meridian rightward and leftward (outward in horizontal direction). In this way, a progressive-power lens that further reduces the amount of image shaking can be provided.

In the design method, it is also effective to design the object-side surface in such a way that the first curvature of the first region, the second curvature of the second region, and the third curvature of the third region have fixed values irrespective of the spectacle specifications.

A progressive-power lens having large addition power specified in spectacle specifications suffers from a large difference in dioptric power between the near portion and the regions on both sides thereof. In view of this fact, the first, second, and third curvature may be determined based on the spectacle specifications. On the other hand, the ratio of magnification or the difference in magnification between an image formed through the distance portion and an image formed through the near portion can be reduced and hence the degree of image shaking can be suppressed by setting the first and second curvature to be a fixed value and the third curvature to be a smaller value than the fixed value irrespective of addition power, as described above. As a result, semifinished design in which a fixed object-side surface is used can be employed by using fixed first, second, and third curvature irrespective of spectacle specifications, whereby the manufacturing cost can be reduced.

In the design method, the object-side surface may be so designed that the first curvature of the first region, the second curvature of the second region, and the third curvature of the third region have fixed values irrespective of addition power specified in the spectacle specifications when the addition power falls within a predetermined range. Semifinished design in which a fixed object-side surface is used can be employed when the addition power specified in the spectacle specifications falls within a certain range, whereby the manufacturing cost can be reduced.

Yet another aspect of the invention relates to a progressive-power lens manufacturing method including manufacturing a progressive-power lens designed based on the design method described above.

BRIEF DESCRIPTION OF THE DRAWINGS

The invention will be described with reference to the accompanying drawings, wherein like numbers reference like elements.

FIG. 1 is a perspective view showing an example of spectacles.

FIG. 2A is a plan view diagrammatically showing a progressive-power lens, and FIG. 2B is a cross-sectional view of the progressive-power lens.

FIG. 6 shows the distribution of the power of the outer surface.

FIG. 7 shows the distribution of the curvature of the outer surface.

FIG. 8 shows the distribution of the radius of curvature of the outer surface.

FIG. 9 shows the magnification of the progressive-power lens according to Example 1.

FIG. 10 shows the magnification of progressive-power lens according to Comparative Example 1.

FIG. 11 shows the difference in the magnification between the progressive-power lens according to Example 1 and the progressive-power lens according to Comparative Example 1.

FIG. 13 shows the magnification of progressive-power lens according to Example 2.

FIG. 14 shows the magnification of a progressive-power lens according to Comparative Example 2.

FIG. 15 shows the difference in the magnification between the progressive-power lens according to Example 2 and the progressive-power lens according to Comparative Example 2.

FIG. 16 shows the magnification of a progressive-power lens according to Example 3.

FIG. 17 shows the magnification of a progressive-power lens according to Comparative Example 3.

FIG. 18 shows the difference in the magnification between the progressive-power lens according to Example 3 and the magnification of the progressive-power lens according to Comparative Example 3.

DESCRIPTION OF EXEMPLARY EMBODIMENTS

Figure 3A:
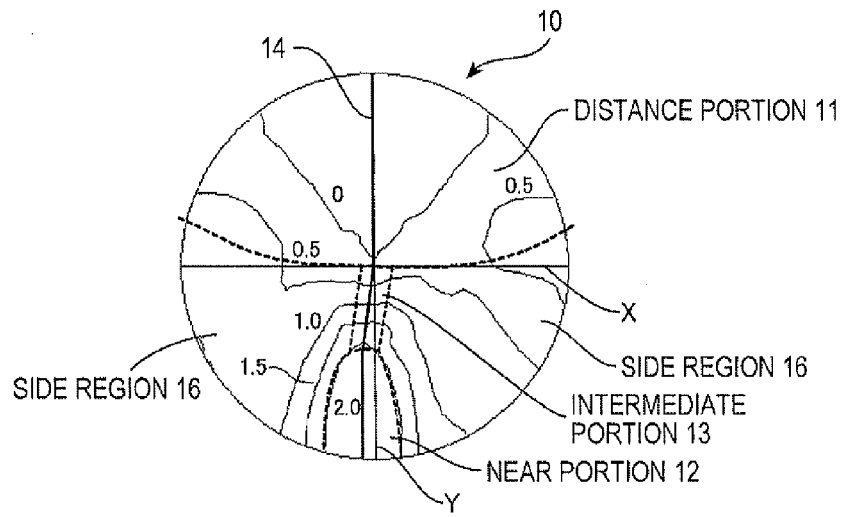
FIG. 3A shows a dioptric power distribution of a spectacle lens.

FIG. 1 is a perspective view showing an example of spectacles. FIG. 2A is a plan view diagrammatically showing a progressive-power lens according to an embodiment of the invention. FIG. 2B is a cross-sectional view diagrammatically showing the progressive-power lens.

In the present embodiment, the following description will be made by assuming that the right and left are considered as the right and left sides viewed from a user (wearer, eyeball). Spectacles 1 include a pair of right and left spectacle lenses 10R, 10L for the right and left eyes and a spectacle frame 20 to which the lenses 10R and 10L are attached. Each of the spectacle lenses 10R and 10L is a progressive-power lens.

Each of the lenses 10R and 10L basically has a meniscus shape convex toward an object. Each of the lenses 10R and 10L therefore has an object-side surface (convex surface, hereinafter also referred to as outer surface) 19A and an eyeball-side (user-side) surface (concave surface, hereinafter also referred to as inner surface) 19B.

FIG. 2A shows the lens 10R for the right eye. The lens 10R has a distance portion 11, which is an upper viewing area that allows the wearer to view a distant object (distance vision), and a near portion 12, which is a lower viewing area that allows the wearer to view a near object (near vision) and has dioptric power (power) different from that of the distance portion 11. The lens 10R further has an intermediate portion (portion for intermediate vision, progressive portion) 13 that connects the distance portion 11 and the near portion 12 to each other in such a way that the power continuously changes across the boundary therebetween. The lens 10R further has a principal line of fixation 14 that connects on-lens positions that are the centers of the viewing areas for distance vision, intermediate vision, and near vision. A fitting point Pe, which is an on-lens reference point through which the line of sight is designed to pass when the wearer horizontally views a distant object in front of the wearer (primary position) with the periphery of the spectacle lens 10R is so shaped that the lens is fit and fixed in the frame, is typically positioned in the vicinity of the lower end of the distance portion 11.

In the following description, it is assumed that the fitting point Pe is the origin of the coordinates of the lens, and let an x coordinate be the horizontal coordinate along a horizontal reference line X passing through the fitting point Pe, and a y coordinate be the vertical coordinate along a vertical reference line (principal meridian) Y passing through the fitting point Pe. The principal line of fixation 14, after it passes through the fitting point Pe or a point in the vicinity thereof, deviates from the principal meridian Y toward the nose. The distance 15 between the principal line of fixation 14 and the principal meridian Y is referred to as an inset.

The following description of a spectacle lens will be made primarily based on the spectacle lens 10R for the right eye. A spectacle lens or a lens described herein may be the lens 10L for the left eye, because the spectacle lens 10R for the right eye and the spectacle lens 10L for the left eye have basically symmetric right and left configurations except differences in spectacle specifications between the right and left eyes. In the following description, the spectacle lens 10R for the right eye and the spectacle lens 10L for the left eye are collectively referred to as a spectacle lens (or lens) 10.

Among a variety of optical performance characteristics of the progressive-power lens 10, the size of the field of view can be determined by an astigmatism distribution diagram or a spherical dioptric power equivalent distribution diagram. One of the important performance characteristics of the progressive-power lens 10 is the degree of image shaking that the wearer who wears the progressive-power lens 10 senses when the wearer moves the line of sight. It is noted that progressive-power lenses 10 having substantially the same astigmatism distribution or spherical dioptric power equivalent distribution may differ from each other in terms of image shaking in some cases.

Figure 3B:
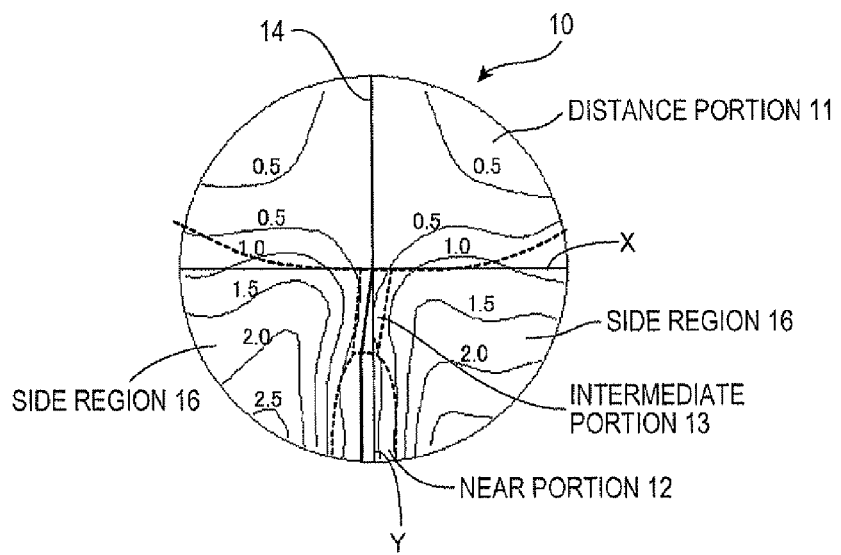
FIG. 3B shows an astigmatism distribution of the spectacle lens.
Figure 3C:
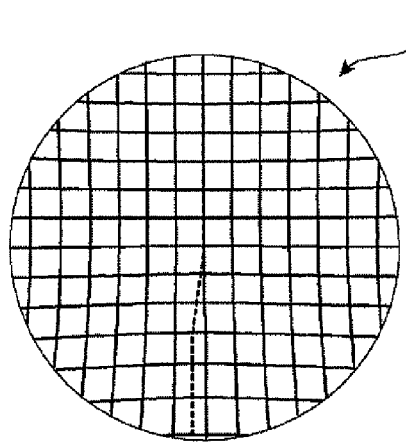
FIG. 3C shows distortion of a square grid viewed through the spectacle lens.

FIG. 3A shows a dioptric power distribution (power distribution in dioptre (D)) of a typical progressive-power lens 10. FIG. 3B shows an astigmatism distribution (in dioptre (D)). FIG. 3C shows distortion of a square grid viewed through the lens 10. In the progressive-power lens 10, predetermined dioptric power is added along the principal line of fixation 14. Adding dioptric power causes a large amount of astigmatism on both sides of the intermediate portion 13, resulting in a blurred image formed through either of the side regions. In the dioptric power distribution, the dioptric power increases in the near portion 12 by a predetermined amount (addition power) and gradually decreases through the intermediate portion 13 and the distance portion 11. In the distance portion 11 of the progressive-power lens 10, the dioptric power (distance dioptric power, Sph) is 0.00 D (dioptre), and the addition power (Add) is 2.00 D.

Due to the difference in dioptric power across the lens 10, the near portion 12, where the dioptric power is larger, forms a more magnified image than the distance portion 11. An image of the square grid formed through a portion on either side of the intermediate portion 13 and the near portion 12 is therefore enlarged and slightly distorted as compared with an image formed through the distance portion 11. The variation in the magnification at which an image is formed causes image shaking when the wearer moves the head or the line of sight.

The magnification M of a spectacle lens is approximately expressed by the following expression.

$$M = Ms \times Mp \quad (2)$$

In Expression (2), Ms represents a shape factor, and Mp represents a power factor. Now, let n be the refractive index of the material of the lens, D (dioptre) be the base curve (surface power) of the object-side surface of the lens, L be the distance from the vertex of the eyeball-side surface of the lens (inner vertex) to the eyeball, P (dioptric power S) be the power at the inner vertex (inner vertex power), and t be the central thickness of the lens, and Mp and Ms are expressed as follows.

$$Ms = 1/(1 - D \times t/n) \quad (3)$$

$$Mp = 1/(1 - L \times P) \quad (4)$$

To evaluate Expressions (3) and (4), the base curve D and the inner vertex power P are measured in dioptre (D), and the thickness t and the distance L are measured in meter (m).

Expression (2) is therefore rewritten as follows.

$$M = \{1/(1 - D \times t/n)\} \times \{1/(1 - L \times P)\} \quad (5)$$

Expression (5) shows that the magnification M increases as the power P increases, which means that the magnification M at which an image is formed through a side region 16 on each side of the intermediate portion 13 and the near portion 12 is greater than the magnification at which an image is formed through the distance portion 11. To address the problem, the magnification M can be reduced by reducing the degree of the base curve D, that is, the surface power of the outer surface 19A.

In view of the fact described above, the type of lens employed in Examples described below is an inner-surface progressive lens, and the change in magnification at which an image is formed through either of the side regions 16 and hence the amount of image shaking are reduced by reducing the surface power of the portions of the outer surface 19A that face the side regions 16, which are located outside the intermediate portion 13 and the near portion 12 of the inner surface 19B.

EXAMPLES

Example 1

A progressive-power lens 10a according to Example 1 was designed based on an inner-surface progressive-power lens "Seiko Super P-1" type A (refractive index: 1.67) manufactured by Seiko Epson Corp. to which the following spectacle specifications were applied: the length of the progressive corridor was 14 mm; the prescribed dioptric power (distance dioptric power, Sph) was 0.00 D; and the addition power (Add) was 1.00 (D). Further, the diameter of the lens 10a was 65 mm, and no astigmatism dioptric power was considered. The progressive-power lens 10a therefore has a progressive inner surface 19B including the distance portion 11, the near portion 12, the intermediate portion 13, and the side regions 16 shown in FIG. 3A.

Figures 4, 5:
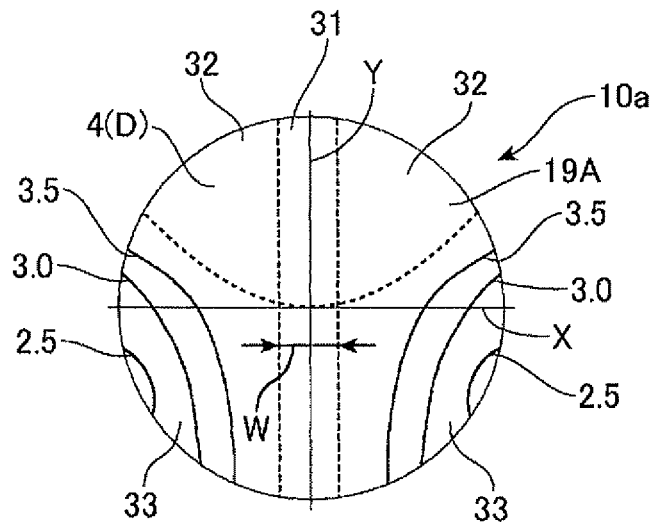
FIG. 4 shows the distribution of surface power of an outer surface of a progressive-power lens according to Example 1.
FIG. 5 shows the distributions of the power, curvature, and radius of curvature of the outer surface versus the distance from a principal meridian (y coordinate in the horizontal direction).

FIG. 4 shows the distribution of the surface power of the outer surface 19A of the progressive-power lens 10a according to Example 1. FIG. 5 shows the distributions of the power, curvature, and radius of curvature of the outer surface 19A versus the distance from the principal meridian Y (y coordinate in the horizontal direction). FIG. 6 shows the distribution of the power of the outer surface 19A in the form of coordinate matrix (x,y). FIG. 7 shows the distribution of the curvature of the outer surface 19A in the form of coordinate matrix (x,y). FIG. 8 shows the distribution of the radius of curvature of the outer surface 19A in the form of coordinate matrix (x,y).

The outer surface 19A is basically a spherical surface having a surface power of 4.00 (D) and has aspherical regions on both sides thereof. In the aspherical regions, the surface power monotonously decreases gradually toward the periphery. That is, the object-side surface (outer surface) 19A has a spherical first region 31 extending along the principal meridian Y and having first curvature r1 (first surface power D1), a spherical second region 32 facing the distance portion 11 and having second curvature r2 (second surface power D2), which is equal to the first curvature r1, and a third region 33 located outside the first region 31 and below the second region 32 and having third curvature r3 (third surface power D3), which is smaller than the first curvature r1. The third region 33 is, in practice, the region of the outer surface 19A that is outside the intermediate portion 13 and the near portion 12 of the inner surface 19B in the horizontal direction, that is, the region that faces (corresponds to) the side regions 16.

In the progressive-power lens 10a according to Example 1, the first curvature r1 and the second curvature r2 are 6.042 (1/m) and the first surface power D1 and the second surface power D2 are 4.0 (D). The third curvature r3, which is smaller than the first curvature r1, gradually decreases from the value of 6.042 (1/m) at the boundary between the first region 31 and the third region 33 with distance from the boundary outward in the horizontal direction and reaches 3.021 (1/m) in the vicinity of the periphery (edge). When the above situation is described in terms of surface power, the third surface power D3, which is smaller than the first surface power D1, gradually decreases from the value of 4.0 (D) at the boundary between the first region 31 and the third region 33 with distance from the boundary outward in the horizontal direction and reaches 2.0 (D) in the vicinity of the periphery (edge). In other words, the first region 31 and the second region 32 are formed of a spherical surface, and the third region 33 is formed of an aspherical surface.

In the progressive-power lens 10a according to the present example, the third curvature r3 of the third region 33 monotonously decreases with distance from the principal meridian Y outward in the horizontal direction. That is, in FIG. 4, the isoquant curves representing the third surface power D3 corresponding to the third curvature r3 of the third region 33 are spaced substantially uniformly.

The width W of the first region 31 corresponding to both sides of the principal meridian Y is 8 mm (distance from principal meridian Y (y coordinate) is ±4 mm), which satisfies the condition (1) described above. In a typical progressive-power lens 10 (most progressive-power lenses 10), the inset of the near portion 12, that is, the distance 15 between the principal line of fixation 14 in the near portion 12 and the principal meridian Y, ranges from 2 to 3 mm. In view of this fact, when the width W of the first region 31 corresponding to both sides of the principal meridian Y is 6 mm, that is, when a fixed-curvature region having a width of ±3 mm with respect to the principal meridian Y is provided, the intermediate portion (progressive portion) 13 is accommodated in the fixed-curvature region, whereby the viewing area of the intermediate portion 13, which has the narrowest viewing area, is ensured.

On the other hand, the near portion 12 of a current progressive-power lens 10 is inset by 5 mm at the maximum, which is practically the greatest value necessary for an object distance of 15 cm. When the center of the near portion is inset by 5 mm, another ensured viewing area of 2 mm may be provided by increasing the width W of the first region 31 corresponding to both sides of the principal meridian Y to 14 mm, that is, by providing a fixed-curvature region having a width of ±7 mm with respect to the principal meridian Y.

When the width W of the first region 31 is close to the upper limit of the condition (1), that is, when the outer surface (convex surface) 19A has a fixed-curvature region having a width of ±7 mm corresponding to both sides of the principal meridian Y, the inner surface (concave surface) 19B may be configured based on basic progressive design. On the other hand, when the width W of the first region 31 is close to the lower limit of the condition (1), that is, when the outer surface (convex surface) 19A has a fixed-curvature region having a width of ±3 mm corresponding to both sides of the principal meridian Y, the first region 31 alone may not ensure the width of a bright field of the near portion 12 in some cases. In this case, the viewing area of the near portion 12 can be ensured by correcting the progressive design of the inner surface (concave surface) 19B. For example, it is conceivable to add an aspherical element whose curvature is distributed in the horizontal direction in accordance with the change in curvature of the outer surface 19A to the inner surface 19B.

Comparative Example 1

A progressive-power lens 10b was designed as Comparative Example 1 and compared with the progressive-power lens 10a according to Example 1. The progressive-power lens 10b has a spherical outer surface 19A having a surface power of 4.0 (D) and the same inner surface 19B as that of the progressive-power lens 10a.

Comparison

Figure 10:
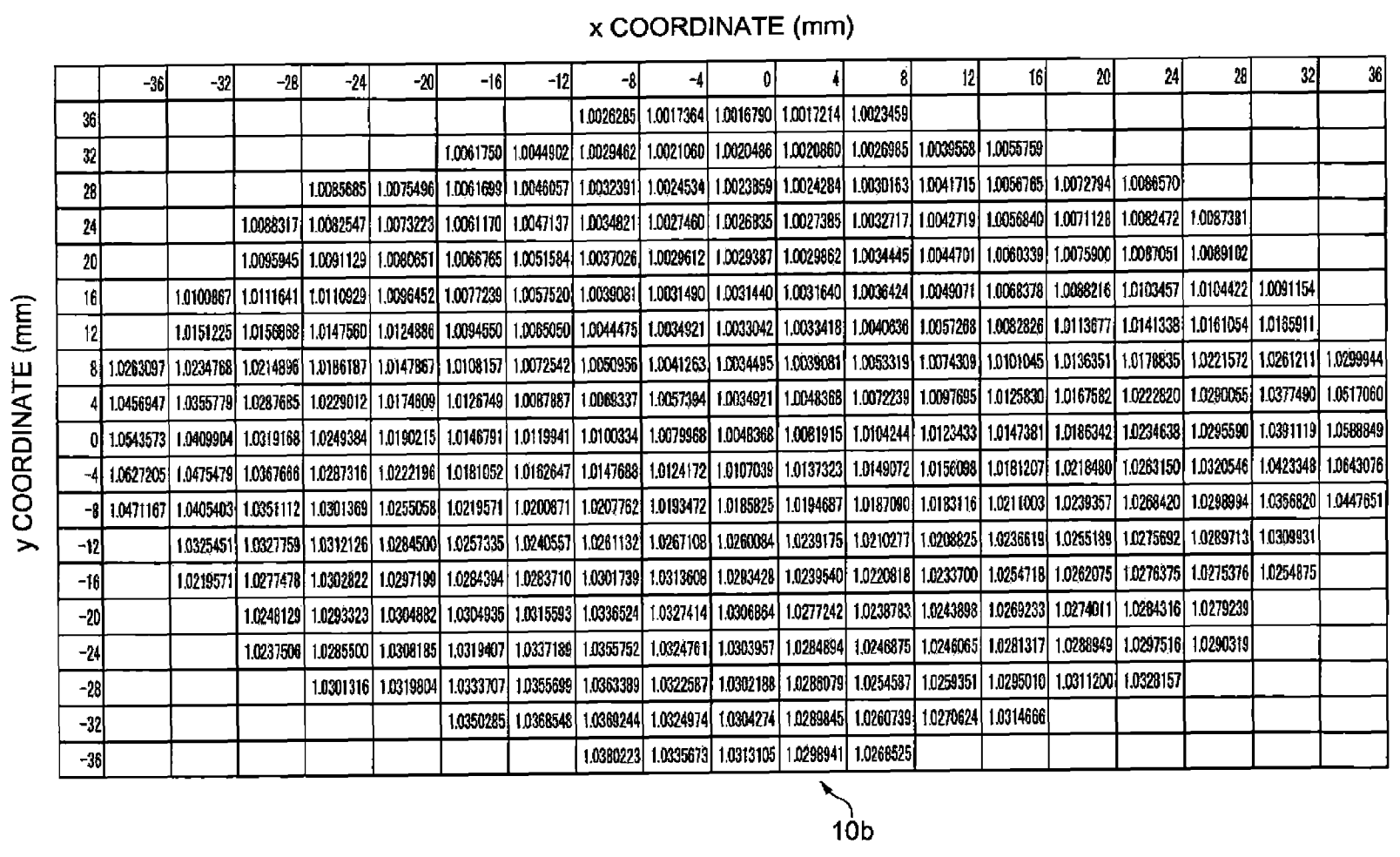
Figure 11:
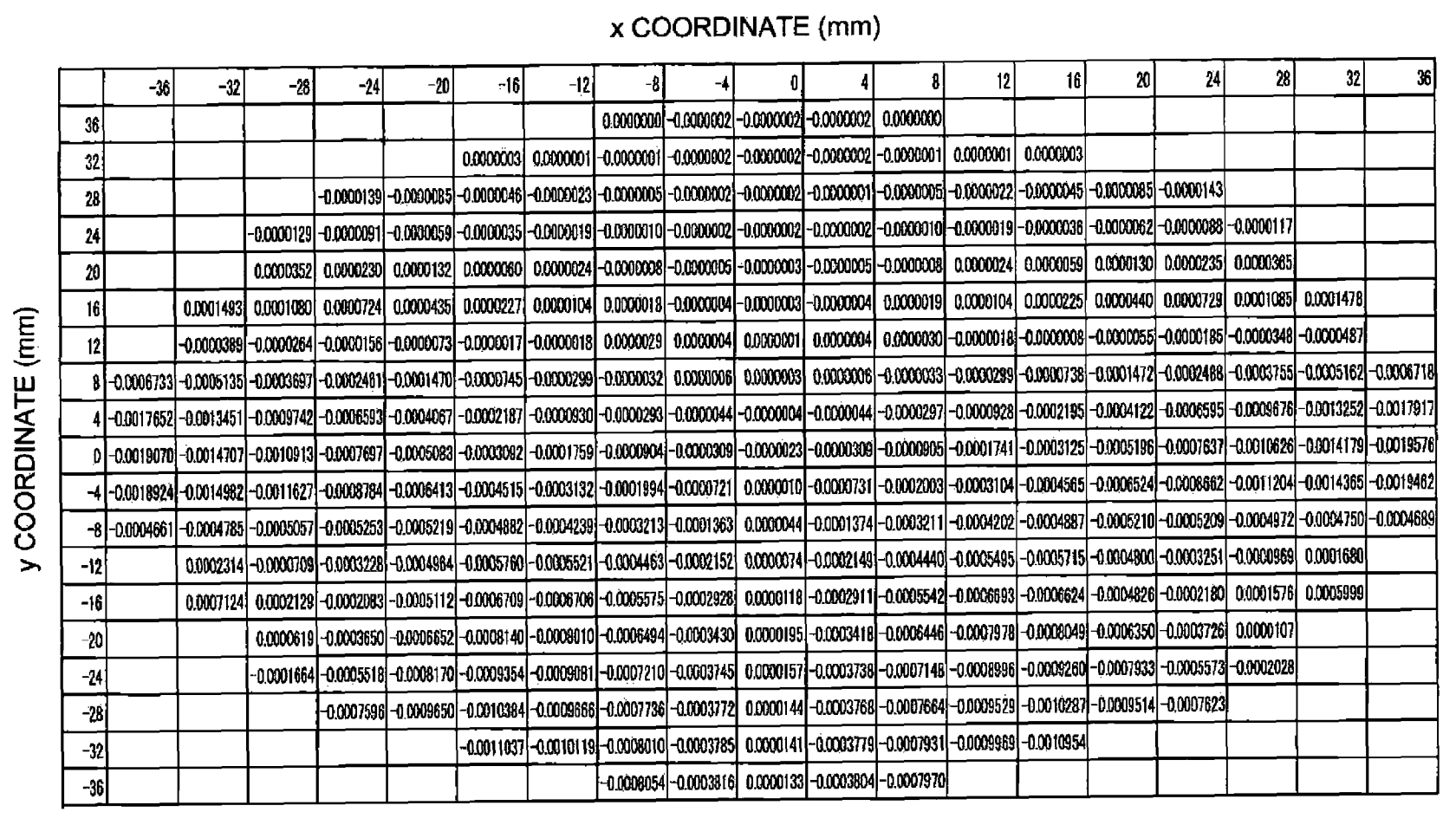

FIG. 9 shows the magnification at which an image is formed through the progressive-power lens 10a according to Example 1 in the form of coordinate matrix (x,y). FIG. 10 shows the magnification at which an image is formed through the progressive-power lens 10b according to Comparative Example 1 in the form of coordinate matrix (x,y). FIG. 11 shows the difference in the magnification between the progressive-power lens 10a according to Example 1 and the progressive-power lens 10b according to Comparative Example 1 in the form of coordinate matrix (x,y).

For example, look at the magnification at an x coordinate of −24 mm of the progressive-power lens 10b according to Comparative Example 1 shown in FIG. 10. The magnification is 1.0147560 at a y coordinate of 12 mm in the distance portion 11, and 1.0287316 at a y coordinate of −4 mm, which is apart sideways from the intermediate portion 13. Therefore, an image formed through a region outside the intermediate portion 13 is larger than an image formed through the distance portion 11, and the ratio of the magnification between the two regions is about 101.38%.

On the other hand, look at the magnification at the x coordinate of −24 mm of the progressive-power lens 10a according to Example 1 shown in FIG. 9. The magnification is 1.0147404 at the y coordinate of 12 mm in the distance portion 11 and 1.0278532 at the y coordinate of −4 mm, which is apart sideways from the intermediate portion 13. Therefore, an image formed through the third region 33 outside the intermediate portion 13 is still larger than an image formed through the distance portion 11 (second region 32), but the magnification in the outer third region 33 is smaller than the corresponding value in Comparative Example 1 and the magnification ratio is about 101.29%. In other words, the ratio of the magnification at which an image is formed through either of the (right and left) regions outside the intermediate portion 13 to the magnification at which an image is formed through the distance portion 11 is improved by about 0.09, whereby the degree of image shaking produced when the line of sight 2 is moved from the distance portion 11 to either of the portions outside the intermediate portion 13 can be reduced.

In the progressive-power lens 10a according to Example 1, the magnification is smaller substantially across the side regions 16 outside the intermediate portion 13 and the near portion 12 than that of the progressive-power lens 10b according to Comparative Example 1, whereby the difference in magnification (ratio of magnification) between an image formed through either of the side regions 16 outside the intermediate portion 13 and an image formed through the distance portion 11 is reduced, as shown FIG. 11.

Figure 12:
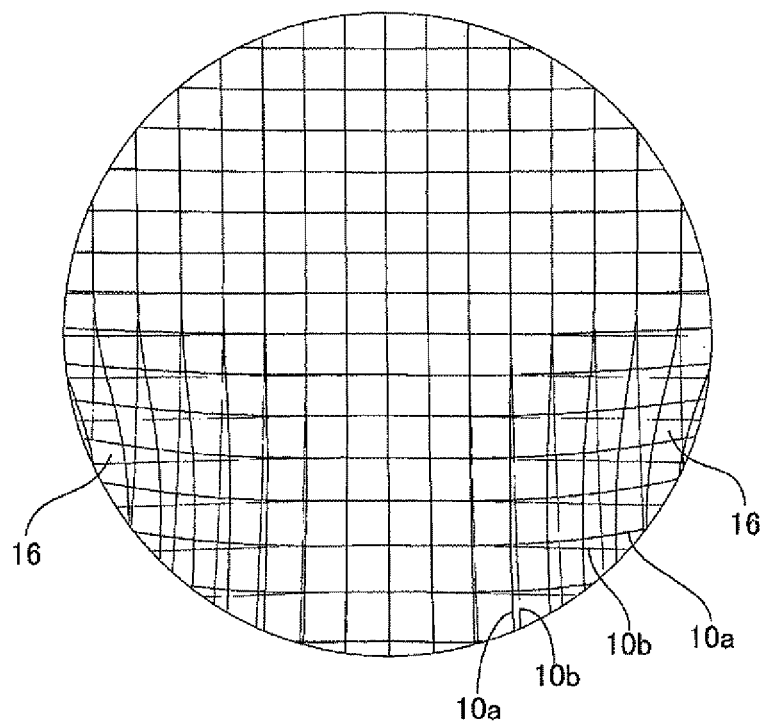
FIG. 12 shows distortion of the square grid viewed through the progressive-power lens according to Example 1 and the progressive-power lens according to Comparative Example 1.

FIG. 12 shows distortion of the square grid viewed through the progressive-power lens 10a according to Example 1 and the progressive-power lens 10b according to Comparative Example 1. In the progressive-power lens 10b according to Comparative Example 1, since the magnification increases on both sides of the intermediate portion 13 and the near portion 12, the resultant image of the grid is enlarged. In contrast, in the progressive-power lens 10a according to Example 1, since the increase in magnification on both sides of the intermediate portion 13 and the near portion 12 is smaller, the increase in the width of the grid and hence the change in size of the resultant image are smaller. The spectacles 1 using the progressive-power lens 10a allow a user who frequently looks at an object through a region from the distance portion 11 to the intermediate portion 13, for example, a user who frequently uses a personal computer, to look at an object with less image shaking resulting from vertical movement of the line of sight 2 and hence provide excellent viewing performance.

Example 2 and Comparative Example 2

A progressive-power lens 10c according to Example 2 was designed based on the inner-surface progressive-power lens "Seiko Super P-1" type A (refractive index: 1.67) manufactured by Seiko Epson Corp. to which the following spectacle specifications were applied: the length of the progressive corridor was 14 mm; the prescribed dioptric power (distance dioptric power, Sph) was 0.00 D; and the addition power (Add) was 2.00 (D). The other conditions are the same as those of the progressive-power lens 10a according to Example 1, and the progressive inner surface 19B includes the distance portion 11, the near portion 12, the intermediate portion 13, and the side regions 16. The outer surface 19A is basically a spherical surface having a surface power of 4.00 (D) and has aspherical regions on both sides thereof. In the aspherical regions, the surface power monotonously decreases gradually toward the periphery. Specifically, the outer surface 19A is the same as that of the progressive-power lens 10a according to Example 1. That is, the object-side surface (outer surface) 19A has a spherical first region 31 extending along the principal meridian Y and having first curvature r1 (first surface power D1), a spherical second region 32 facing the distance portion 11 and having second curvature r2 (second surface power D2), which is equal to the first curvature r1, and a third region 33 located outside the first region 31 and below the second region 32 and having third curvature r3 (third surface power D3), which is smaller than the first curvature r1.

A progressive-power lens 10d was designed as Comparative Example 2 and compared with the progressive-power lens 10c according to Example 2. The progressive-power lens 10d has a spherical outer surface 19A having a surface power of 4.0 (D) and the same inner surface 19B as that of the progressive-power lens 10c.

Comparison

Figure 15:
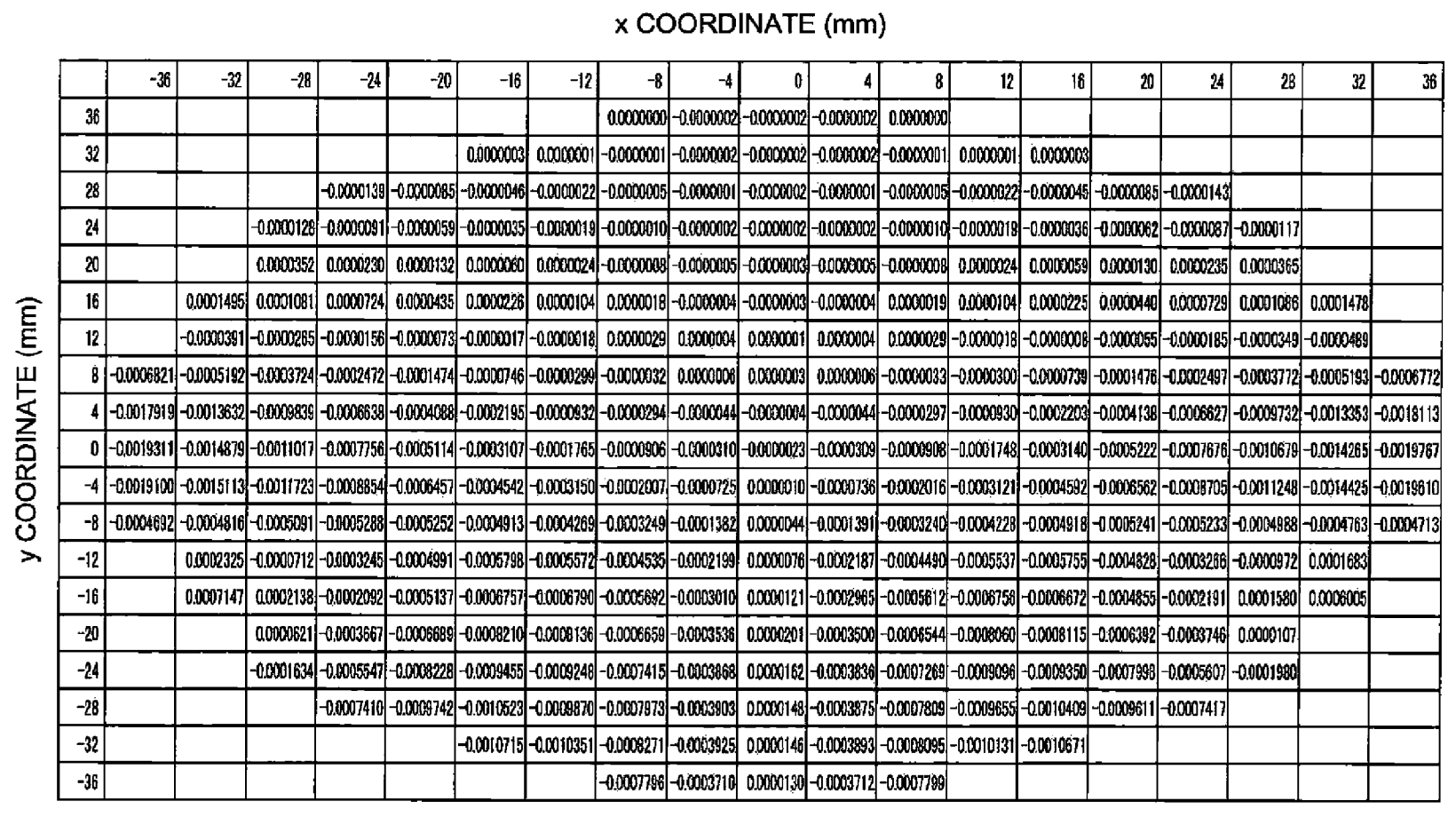

FIG. 13 shows the magnification at which an image is formed through the progressive-power lens 10c according to Example 2 in the form of coordinate matrix (x,y). FIG. 14 shows the magnification at which an image is formed through the progressive-power lens 10d according to Comparative Example 2 in the form of coordinate matrix (x,y). FIG. 15 shows the difference in the magnification between the progressive-power lens 10c according to Example 2 and the progressive-power lens 10d according to Comparative Example 2 in the form of coordinate matrix (x,y).

As in Example 1, look at the magnification at the x coordinate of −24 mm of the progressive-power lens 10d according to Comparative Example 2 shown in FIG. 14. The magnification is 1.0169821 at the y coordinate of 12 mm in the distance portion 11 and 1.0369164 at the y coordinate of −4 mm, which is apart sideways from the intermediate portion 13. Therefore, an image formed through the third region 33 outside the intermediate portion 13 is larger than an image formed through the distance portion 11 (second region 32), and the ratio of the magnification between the two regions is about 101.96%.

On the other hand, look at the magnification at the x coordinate of −24 mm of the progressive-power lens 10c according to Example 2 shown in FIG. 13. The magnification is 1.0169664 at the y coordinate of 12 mm in the distance portion 11 and 1.0360310 at the y coordinate of −4 mm, which is apart sideways from intermediate portion 13. Therefore, an image formed through the third region 33 outside the intermediate portion 13 is still larger than an image formed through the distance portion 11 (second region 32), but the magnification in the third region 33 is smaller than the corresponding value in Comparative Example 2 and the magnification ratio is about 101.87%. In other words, the ratio of the magnification at which an image is formed through either of the (right and left) regions outside the intermediate portion 13 in the horizontal direction to the magnification at which an image is formed through the distance portion 11 is improved by about 0.09, whereby the degree of image shaking produced when the line of sight 2 is moved from the distance portion 11 to either of the portions outside the intermediate portion 13 can be reduced.

Also in the progressive-power lens 10c according to Example 2, the magnification is smaller substantially across the side regions 16 outside the intermediate portion 13 and the near portion 12 than that of the progressive-power lens 10d according to Comparative Example 2, whereby the difference in magnification (ratio of magnification) between an image formed through either of the regions 16 outside the intermediate portion 13 and an image formed through the distance portion 11 is reduced, as shown FIG. 15.

Example 3 and Comparative Example 3

A progressive-power lens 10e according to Example 3 was designed based on the inner-surface progressive-power lens "Seiko Super P-1" type A (refractive index: 1.67) manufactured by Seiko Epson Corp. to which the following spectacle specifications were applied: the length of the progressive corridor was 14 mm; the prescribed dioptric power (distance dioptric power, Sph) was 0.00 D; and the addition power (Add) was 3.00 (D). The other conditions are the same as those of the progressive-power lens 10a according to Example 1, and the progressive inner surface 193 includes the distance portion 11, the near portion 12, the intermediate portion 13, and the side regions 16. The outer surface 19A is basically a spherical surface having a surface power of 4.00 (D) and has aspherical regions on both sides thereof. In the aspherical regions, the surface power monotonously decreases gradually toward the periphery. Specifically, the outer surface 19A is the same as that of the progressive-power lens 10a according to Example 1. That is, the object-side surface (outer surface) 19A has a spherical first region 31 extending along the principal meridian Y and having first curvature r1 (first surface power D1), a spherical second region 32 facing the distance portion 11 and having second curvature r2 (second surface power D2), which is equal to the first curvature r1, and a third region 33 located outside the first region 31 and below the second region 32 and having third curvature r3 (third surface power D3), which is smaller than the first curvature r1.

A progressive-power lens 10f was designed as Comparative Example 3 and compared with the progressive-power lens 10e according to Example 3. The progressive-power lens 10f has a spherical outer surface 19A having a surface power of 4.0 (D) and the same inner surface 19B as that of the progressive-power lens 10e.

Comparison

Figure 18:
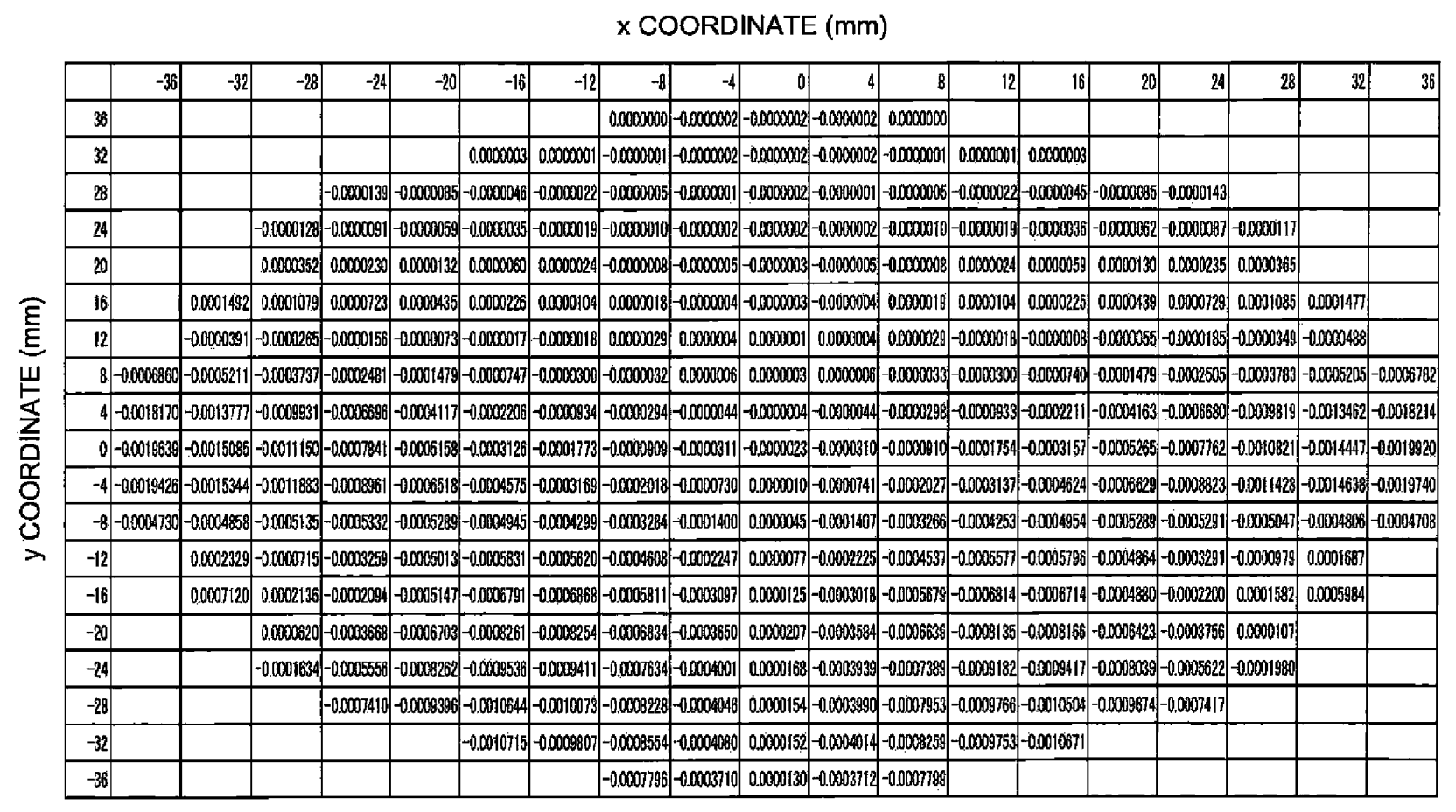

FIG. 16 shows the magnification at which an image is formed through the progressive-power lens 10e according to Example 3 in the form of coordinate matrix (x,y). FIG. 17 shows the magnification at which an image is formed through the progressive-power lens 10f according to Comparative Example 3 in the form of coordinate matrix (x,y). FIG. 18 shows the difference in the magnification between the progressive-power lens 10e according to Example 3 and the progressive-power lens 10f according to Comparative Example 3 in the form of coordinate matrix (x,y).

As in Example 1, look at the magnification at the x coordinate of −24 mm of the progressive-power lens 10f according to Comparative Example 3 shown in FIG. 17. The magnification is 1.0167248 at the y coordinate of 12 mm in the distance portion 11 and 1.0495036 at the y coordinate of −4 mm, which is apart sideways from the intermediate portion 13. Therefore, an image formed through the third region 33 outside the intermediate portion 13 is larger than an image formed through the distance portion 11 (second region 32), and the ratio of the magnification between the two regions is about 103.22%.

On the other hand, look at the magnification at the x coordinate of −24 mm in the progressive-power lens 10e according to Example 3 shown in FIG. 16. The magnification is 1.0167092 at the y coordinate of 12 mm in the distance portion 11 and 1.0486075 at the y coordinate of −4 mm, which is apart sideways from the intermediate portion 13. Therefore, an image formed through the third region 33 outside the intermediate portion 13 is still larger than an image formed through the distance portion 11 (second region 32), but the magnification in the third region 33 is smaller than the corresponding value in Comparative Example 3 and the magnification ratio is about 103.14%. In other words, the ratio of the magnification at which an image is formed through either of the (right and left) regions outside the intermediate portion 13 in the horizontal direction to the magnification at which an image is formed through the distance portion 11 is improved by about 0.08, whereby the degree of image shaking produced when the line of sight 2 is moved from the distance portion 11 to either of the portions outside the intermediate portion 13 can be reduced.

Also in the progressive-power lens 10e according to Example 3, the magnification is smaller substantially across the side regions 16 outside the intermediate portion 13 and the near portion 12 than that of the progressive-power lens 10f according to Comparative Example 3, whereby the ratio of magnification (difference in magnification) between an image formed through either of the regions 16 outside the intermediate portion 13 and an image formed through the distance portion 11 is reduced, as shown FIG. 18.

As described above, in the progressive-power lenses 10a, 10c, and 10e according to Examples 1 to 3, the inner surface 19B is designed based on the addition power in the spectacle specifications being 1.00 (D), 2.00 (D), and 3.00 (D), respectively. On the other hand, the progressive-power lenses 10a, 10c, and 10e has the common outer surface 19A, which has the spherical first region 31 extending along the principal meridian Y, the spherical second region 32 facing the distance portion 11, and the aspherical third region 33 facing the side regions 16 and having surface power decreasing with distance outward from the principal meridian Y. Therefore, even when progressive-power lenses 10 have different spectacle specifications, particularly different addition power specifications, using the common outer surface 19A reduces the amount of image shaking produced when the line of sight 2 is moved from the distance portion 11 to either side of the intermediate portion 13. Further, a progressive-power lens having large addition power suffers from a large difference in magnification between the near portion 12 and the regions on both sides thereof, as described above. In view of this fact, the ratio of magnification in the horizontal direction may be further reduced by appropriately setting the addition power in the spectacle specifications to select the change from the first curvature r1 of the first region 31 and the second curvature r2 of the second region 32 of the outer surface 19A to the third curvature r3 of the third region 33 of the outer surface 19A.

Figure 19:
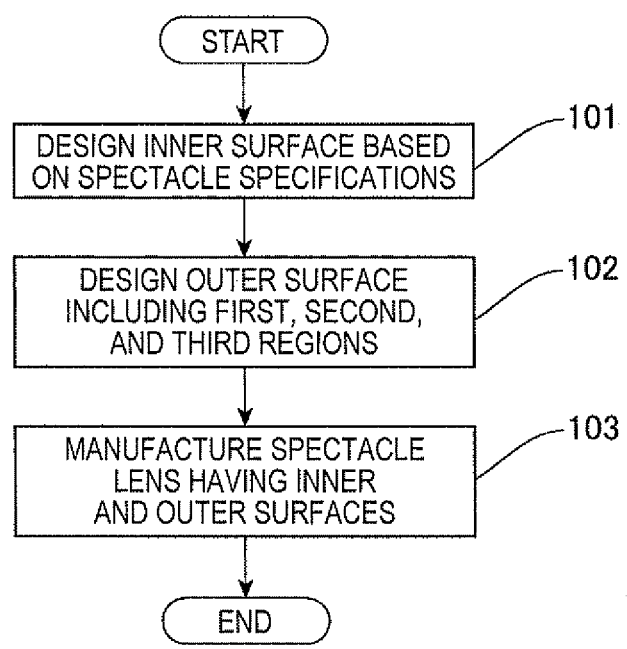
FIG. 19 is a flowchart showing a schematic design/manufacture procedure.

FIG. 19 shows a procedure of designing and manufacturing the progressive-power lens 10. In step 101, the inner surface (eyeball-side surface) 1913 is designed based on spectacle specifications. In the progressive-power lens 10, the inner surface 19B is a progressive surface and includes the distance portion 11, the intermediate portion 13, and the near portion 12.

Before or after step 101 or simultaneously therewith, in step 102, the outer surface (object-side surface) 19A including the first region 31, the second region 32, and the third region 33 is designed. In step 102, the outer surface 19A may be a common surface irrespective of the spectacle specifications, that is, may have a common first region 31, a common second region 32, and a common region 33 for all spectacle specifications. For example, irrespective of the addition power specified in the spectacle specifications, the outer surface 19A may be designed in accordance with inner surface progressive design having an addition power of 0.5 (D), and then a progressive-power lens having an addition power of 3.5 (D) may be designed based on the thus designed outer surface (convex surface) 19A. In this case, a pre-manufactured, semi-finished lens can be prepared in advance irrespective of the addition power, which is preferable to reduce the manufacturing cost.

In step 102, when the addition power specified in the spectacle specifications falls within a predetermined range, the outer surface 19A may be designed to have a first region having common first curvature, a second region having common second curvature, and a third region having common third curvature. For example, three types of outer surface 19A having addition power of 0.50, 1.00, and 2.50 may be designed in advance, and a progressive-power lens 10 whose addition power falls within any of the specific ranges may be manufactured by using the corresponding one of the common outer surfaces 19A. In this way, more satisfactory design can be made for predetermined addition power while the manufacturing cost is kept low.

In the following step 103, a spectacle progressive-power lens 10 having the thus designed inner and outer surfaces is manufactured.

The above description has been made with reference to a progressive-power lens having an outer surface 19A formed of a common curved surface irrespective of spectacle specifications, particularly addition power specification. Alternatively, the outer surface 19A may be formed of a curved surface having any other shape based on spectacle specifications within those set forth in the claims. Further, the above description has been made of the case where the third region 33 is formed of an aspherical surface over which the curvature (surface power) changes. The third region 33 may alternatively be formed of a spherical surface having fixed curvature (surface power).

What is claimed is:

1. A progressive-power lens comprising:
   an eyeball-side surface including
   a distance portion and a near portion having different values of dioptric power, and
   an intermediate portion that connects the distance portion and the near portion to each other; and
   an object-side surface including
   a spherical first region having a constant first curvature and extending along a principal meridian,
   a spherical second region having a second curvature equal to the first curvature and facing the distance portion, and
   a third region located outside the first region and below the second region and having a third curvature smaller than the first curvature, wherein the third region has an aspherical shape.

2. The progressive-power lens according to claim 1, wherein the third curvature decreases with distance from the principal meridian outward in a horizontal direction.

3. The progressive-power lens according to claim 2, wherein the third curvature decreases monotonously with distance from the principal meridian outward in the horizontal direction.

4. The progressive-power lens according to claim 1, wherein a width W of the first region corresponding to both sides of the principal meridian satisfies the following condition:

$$6 \leq W \leq 14$$

where the unit of the width W is millimeter.

5. A progressive-power lens design method comprising:
   designing an eyeball-side surface based on a spectacle specifications, the eyeball-side surface including a distance portion and a near portion having different values of dioptric power and an intermediate portion that connects the distance portion and the near portion to each other; and
   designing an object-side surface including a spherical first region having a constant first curvature and extending along a principal meridian, a spherical second region having a second curvature equal to the first curvature and facing the distance portion, and a third region located outside the first region and below the second region and having a third curvature smaller than the first curvature, wherein the third region has an aspherical shape.

6. The design method according to claim 5, wherein the object-side surface is so designed that the first curvature of the first region, the second curvature of the second region, and the third curvature have fixed values irrespective of the spectacle specifications.

7. The design method according to claim 6, wherein the object-side surface is so designed that the first curvature of the first region, the second curvature of the second region, and the third curvature of the third region of the object-side surface have fixed values irrespective of an addition power specified in the spectacle specifications when the addition power falls within a predetermined range.

* * * * *